United States Patent
Achanta

(10) Patent No.: US 10,229,337 B2
(45) Date of Patent: Mar. 12, 2019

(54) SCALE-ADAPTIVE MEDIA ITEM SEGMENTATION TECHNIQUE

(71) Applicant: ECOLE POLYTECHNIQUE FEDERALE DE LAUSANNE (EPFL), Lausanne (CH)

(72) Inventor: Radhakrishna Shri Venkata Achanta, St-Sulpice (CH)

(73) Assignee: ECOLE POLYTECHNIQUE FEDERALE DE LAUSANNE (EPFL), Lausanne (CH)

( * ) Notice: Subject to any disclaimer, the term of this patent is extended or adjusted under 35 U.S.C. 154(b) by 0 days.

(21) Appl. No.: 15/044,841

(22) Filed: Feb. 16, 2016

(65) Prior Publication Data
US 2017/0236289 A1    Aug. 17, 2017

(51) Int. Cl.
*G06K 9/34*   (2006.01)
*G06K 9/46*   (2006.01)
(Continued)

(52) U.S. Cl.
CPC ............. *G06K 9/34* (2013.01); *G06K 9/4652* (2013.01); *G06K 9/6221* (2013.01); *G06T 7/11* (2017.01);
(Continued)

(58) Field of Classification Search
CPC .. G06K 9/6218; G06K 9/6221; G06K 9/6222; G06K 9/6223; G06K 9/623; G06K 9/6232
See application file for complete search history.

(56) References Cited

U.S. PATENT DOCUMENTS 9,412,175 B2*  8/2016 Wang .................. G06K 9/4604
2003/0212702 A1* 11/2003 Campos ........... G06F 17/30598
(Continued)

OTHER PUBLICATIONS

D. Wang et al. "A Cellular Automata Approach for Superpixel Segmentation", 2011 4th International Congress on Image and Signal Processing, pp. 1108-1112.*
(Continued)

*Primary Examiner* — Samir Ahmed
(74) *Attorney, Agent, or Firm* — MU P.C.

(57) ABSTRACT

The present invention concerns a method of segmenting a media item comprising media elements. The method comprises: selecting a first seed media element for a first cluster of media elements, referred to hereinafter as a first adaptel; selecting a second seed media element, different from the first seed media element, for a second cluster of media elements, different from the media elements of the first adaptel, the second cluster being referred to hereinafter as a second adaptel; successively forming the first and second adaptels, starting from the first and second seed media elements, respectively, by allocating a first plurality of the media elements to the first adaptel, and then allocating a second plurality of the media elements to the second adaptel; and reallocating at least one media element of the first adaptel to the second adaptel if a dissimilarity measure between the at least one media element and the second adaptel is smaller than the dissimilarity measure between the at least one media element and the first adaptel. The second seed media element is selected from a set of the media elements neighboring the first adaptel.

20 Claims, 4 Drawing Sheets

(51) Int. Cl.
*G06K 9/62* (2006.01)
*G06T 7/11* (2017.01)
*G06T 7/187* (2017.01)

(52) U.S. Cl.
CPC .... *G06T 7/187* (2017.01); *G06T 2207/10016* (2013.01); *G06T 2207/10024* (2013.01)

(56) References Cited

U.S. PATENT DOCUMENTS

| | | | | |
|---|---|---|---|---|
| 2010/0226566 A1* | 9/2010 | Luo | ........................ | G06K 9/34 382/164 |
| 2013/0156314 A1* | 6/2013 | Pham | .................... | G06T 7/0083 382/173 |
| 2014/0119654 A1* | 5/2014 | Taylor | .................. | G06T 7/0083 382/173 |
| 2014/0153829 A1* | 6/2014 | Pham | ........................ | G06K 9/34 382/173 |
| 2015/0235374 A1* | 8/2015 | Wang | .................... | G06T 7/0081 382/160 |
| 2015/0356730 A1* | 12/2015 | Grove | .................. | G01N 23/046 382/124 |

OTHER PUBLICATIONS

Huazhu Fu et al. "Regularity Preserved Superpixels and Supervoxels", IEEE, 2014, pp. 1165-1175.*
Pierre Buyssens et al. "Eikonal-based region growing for efficient clustering", Image and Vision Computing 2014, vol. 32, pp. 1045-1054.*
M. Van den Bergh et al., "Seeds:Superpixels Extracted via Energy-Driven Sampling",European Conference on Computer Vision—ECCV 2012, pp. 13-26.*

* cited by examiner

SCALE-ADAPTIVE MEDIA ITEM SEGMENTATION TECHNIQUE

TECHNICAL FIELD

The present invention relates to a media item segmentation method, and more particularly to a media item segmentation technique using adaptive superpixels. The invention also relates to a media segmentation apparatus configured to carry out the method and to a computer program product comprising instructions for executing the method.

BACKGROUND OF THE INVENTION

Media item segmentation techniques, such as image segmentation techniques, either try to segment a media item in a semantically meaningful way, or go to the other extreme by creating small clusters of similar pixels or voxels of roughly equal size, called superpixels or supervoxels respectively. The former type of technique rarely succeeds in bridging the semantic gap, while the latter has traditionally been agnostic to even basic properties such as object scale and texture. The following description focuses on image segmentation for simplicity, but can be applied to other media types, such as video or multidimensional scan data.

Image segmentation continues to be a challenge that attracts both domain specific and generic solutions. To avoid the struggle with semantics when using traditional segmentation algorithms, researchers have lately diverted their attention to a much simpler and more achievable task, namely that of simplifying an image into small clusters of connected and contiguous media elements or pixels. Such clusters are called superpixels, and they have quickly become a potent preprocessing tool for simplifying an image from potentially millions of pixels, to about two orders of magnitude fewer clusters of similar pixels. After their introduction, superpixels quickly found their way into a wide-range of computer vision applications such as body model estimation, multi-class segmentation, depth estimation, object localization, optical flow and tracking. For these applications, superpixels are commonly expected to have the following properties:

Tight region boundary adherence (the superpixels do not extend beyond object boundaries).
Containing a small cluster of similar pixels.
Uniformity; roughly equally sized clusters.
Compactness; thereby limiting the degree of adjacency (compactness can be understood as having smoother or less noisy boundaries as opposed to wiggly superpixel boundaries).
Computational efficiency.

When the size of a superpixel is chosen for an application, a strong assumption is made regarding the minimum scale to be preserved. Structures smaller than the superpixel size are sacrificed for the sake of simplifying the image. This may diminish the quality of the output for certain applications that require fine details. At the same time, textureless regions may contain more superpixels than necessary, thus defeating the goal of simplifying the image.

It is an object of the present invention to overcome the problems identified above related to media item segmentation techniques.

SUMMARY OF THE INVENTION

According to a first aspect of the invention, there is provided a method of segmenting a media item as recited in claim 1.

According to a second aspect of the invention, there is provided a computer program product comprising instructions for implementing the steps of the method according to claim 1 when loaded and run on computing means of an electronic device.

According to a third aspect of the invention, there is provided a media item segmentation apparatus for segmenting a media item as recited in claim 20.

The proposed new solution has the advantage that a media item segmentation can be reliably carried out to produce a very high quality segmentation result. In addition, the proposed segmentation algorithm is computationally very efficient, approaching real-time performance, and can be used to segment various media items, such as two-dimensional or three-dimensional image stacks and video volumes. In the algorithm, at least some clusters of media items, referred to as adaptels in the present description as explained later, may be created sequentially, i.e. one after the other. This means that the adaptels are allowed to grow to the maximum or pre-defined size before being reduced by subsequent competing adaptels. As the adaptels are allowed to "compete" this way, this leads to adaptels that have tight boundary adherence. If the adaptels are not allowed to compete, the adaptels may only have compactness, but not tight boundary adherence. Furthermore, the adaptels within a single media item are scalable, i.e. their sizes depend on the texture of the media item as explained later in more detail.

Other aspects of the invention are recited in the dependent claims attached hereto.

BRIEF DESCRIPTION OF THE DRAWINGS

Other features and advantages of the invention will become apparent from the following description of a non-limiting exemplary embodiment, with reference to the appended drawings, in which.

DETAILED DESCRIPTION OF AN EMBODIMENT OF THE INVENTION

Figure 1:
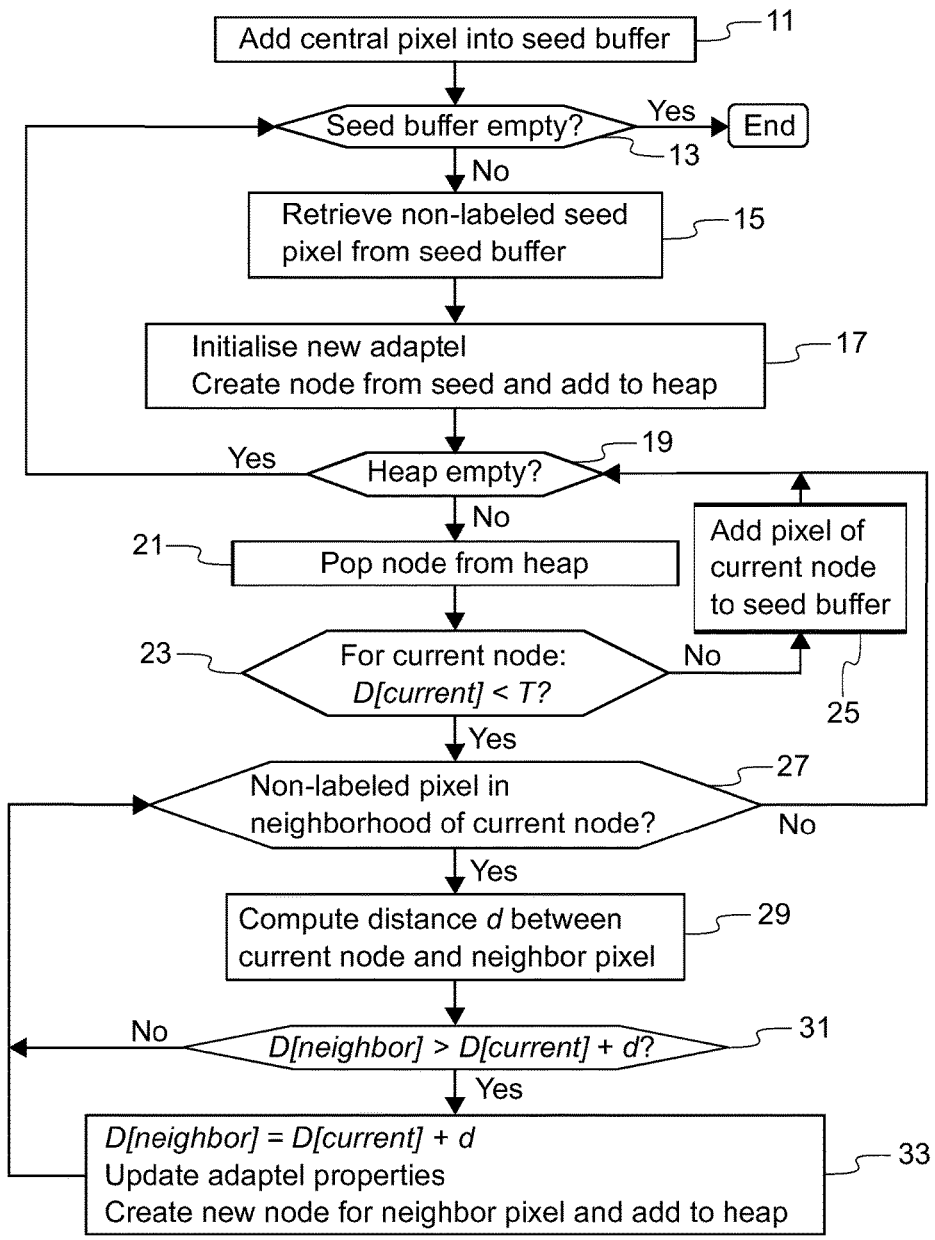
FIG. 1 shows a flow chart of an example image segmentation method according to the present invention.

An embodiment of the present invention will now be described in detail with reference to the attached figures. This embodiment is described in the context of segmenting a two-dimensional (2D) media item, which is an image in the illustrated example, but the teachings of the invention are also applicable to 3D images or other media types, such as videos. Identical or corresponding functional and structural elements which appear in the different drawings are assigned the same reference numerals.

The present invention proposes to alleviate the problem of the superpixel-scale trade-off (a high number of superpixels leads to high quality, but to high complexity, whereas a small number of superpixels leads to a loss of detail, but reduced complexity) by relaxing one single property from the properties characterizing traditional superpixels, namely the uniform size of the superpixels. This leads to a segmentation algorithm in a class of its own. It provides the image simplification offered by compact superpixels, and at the same time captures the simple but elusive property of scale of the image structures. The resulting segmented image contains small superpixels where the image structures are small and large superpixels in textureless regions. The superpixels, sometimes also referred to as segments or clusters, obtained in this manner are thus called adaptels in the present description. The proposed algorithm thus generates compact scale-adaptive superpixels. In other words, the present invention proposes the missing intermediate solution to the segmentation problem—how to avoid the over-zealous under-segmentation of traditional algorithms as well as the pessimistic (not understanding the image semantics) over-segmentation of modern superpixel algorithms. The proposed segmentation technique generates compact adaptels, which adapt automatically to the local texture and scale of a part of an image. Thus, the proposed algorithm liberates the user from making the difficult choice of the right superpixel size. Despite making no assumptions about the semantics of the image, the resulting segments provide a powerful abstraction of the image that has wide-ranging applications. The algorithm is simple and requires just one input threshold, as explained later.

In known segmentation algorithms using superpixels, it is common to initialize superpixel algorithms with the assumption that superpixels are uniformly located along a grid. This is the usual practice because the size of the required superpixel is assumed a priori (or can be computed knowing the required number of superpixels and the image size). Depending on the approach, some algorithms then take the center of each grid-block as the starting seed, while others use the blocks (or strips of blocks) themselves as the initial superpixels, refining them to obtain the final superpixels. The grid-based initialisation of the superpixels enables not only the rough location but also the extent of the superpixel to be determined. However, in the present invention, seed pixel locations are not assigned a priori (except for the first seed pixel of the image). This feature, together with the fact that adaptels are grown sequentially, allows each adaptel to grow to a different size and adapt to the local image texture.

According to the present invention, the uniformity criterion is relaxed in the proposed method. Instead, superpixels are grown sequentially or more precisely successively in the described embodiment, as explained later in more detail. Some notations relevant to the invention are described next, followed by a description of an example segmentation method explained with reference to the flow chart of FIG. 1. The goal is to create the minimum number of regions (of any size and shape), referred to as adaptels, in a 2D image (in this example) with the constraint that the variance-sum of the pixel values, i.e. the size of the adaptel times its variance, (or some other form of accumulated energy) in each connected region (adaptel) is approximately equal and bounded by a threshold, which may be chosen by a user. The problem is intractable because to obtain the globally optimal (or the best possible) solution, one has to try every size and shape of adaptel at each pixel position to finally choose the combination which satisfies the condition to achieve the goal explained above. This requires too much time and computation. Thus, the present invention proposes a solution that tries to achieve this goal by building adaptels one after the other making sure each one satisfies the threshold. The final solution may not be globally optimal but takes much less computational power to obtain something satisfactory and useful. This is why the proposed algorithm can be called greedy—it is trying to be optimal locally, one cluster by one cluster, and not trying to find the perfect global solution.

It is assumed that an input image/containing N pixels is to be segmented. The user-chosen threshold is T. The described example of the proposed method requires the following parameters: a media item descriptor (in this example a pixel descriptor) C, a descriptor accumulator $C^\Sigma$, a distance measure d, a distance map D, a min-heap H, and a seed buffer B. These terms are explained in detail below.

The pixel descriptor could be the pixel grayscale value, pixel color vector, or some other property. In the present example, the CIELAB color vector is used as the descriptor, i.e. $C=[l, a, b]^T$. Thus, every pixel has a color vector value according to CIELAB color space, but other color spaces could be used instead. In the above color vector, l is the brightness value, while a and b are color-opponent dimensions. With every added ith pixel, the descriptor accumulator or in this example a color accumulator $C^\Sigma$ for some kth adaptel $A_k$ is updated as:

$$C_k^\Sigma = \Sigma_{i \in A_k} C_i. \quad (1)$$

The color accumulator is used to compute the average descriptor:

$$C_k^\mu = \frac{C_k^\Sigma}{|A_k|}, \quad (2)$$

where |.| is the cardinality operator. Thus, $|A_k|$ is the size of the adaptel, measured in number of pixels, at a given time instant. The distance d determines how close two descriptors are. In this example, d is computed using the Euclidean distance between two color vectors (see Equation 3). Instead of being a color vector, the descriptor could be another parameter describing a media item.

In the present case, the two descriptors (color vectors) are: the continuously updated average color $C_k^\Sigma$ of $A_k$ and the color vector of a candidate pixel at j that is being considered for inclusion.

$$d_{i,j} = \|C_k^\mu - C_j\|, \quad (3)$$

where ||.|| is the Euclidean distance operator.

The distance map D stores the smallest sum of distances or sum of disparities accumulated upon reaching this pixel from any of the seed pixels. The number of the values in the distance map is the same as the number of pixels in the image. Thus, there is one-to-one correspondence between the distance map values and the image pixels. When growing the kth adaptel $A_k$, if a pixel j in the 4 or 8-connected neighborhood N of a pixel at i (already part of $A_k$) is accepted, the value of the D is updated as follows:

$$D[j] = D[i] + d_{k,j}. \quad (4)$$

The way distances are accumulated in D is the same as when computing the shortest geodesic distance or Dijkstra's shortest path, with the only difference being that $d_{k,j}$ is computed as the distance between the evolving average color $C_k^\mu$ of the adaptel $A_k$ and the color of the pixel at j instead of being the distance between the colors of pixels at i and j, as is conventionally done.

The min-heap H (or alternatively, a priority queue) stores nodes $V_{r,s}$ containing information about a pixel, namely, its index r and the accumulated distance value s=D[r]. In the present description, the term node is understood to refer to a media element, in this example a pixel, associated with at least two parameters, namely an index of the pixel indicating the location of the pixel in the image, and the accumulated distance value. The min-heap keeps the node with the smallest accumulated distance value on top. A heap is a data structure that is a collection of elements. The elements are automatically sorted whenever an element is removed or added to it. The heap data structure often supports two operations—pop, which removes the top-most element, and push, which adds an element. When the pop operation is called, the heap-size reduces by one, while when push is called, heap-size increases by one.

Starting seeds for adaptels are selected from those pixels that were visited in the past when growing an adaptel, but which were not accepted into the adaptel. Such pixels are stored in the seed buffer B. While no particular preference for the order of these pixels is given (e.g. they may be selected randomly also), it is possible to choose them according to some criterion.

Adaptels are built sequentially in this example. This means that a first adaptel is first allowed to grow to its maximum size and only after that is a second adaptel started. However, it would be possible to grow at least some adaptels simultaneously. As each adaptel grows agglomeratively (i.e. by accumulation or by collecting pixels one after the other, and possibly, contiguously), new adaptels compete with the existing ones for acquiring pixels. A new adaptel may acquire pixels from an existing adaptel if they are closer to it (in terms of the accumulated distance value). The adaptels grown at the boundaries of the image do not face such competition from all sides. So, while it is possible to start creating adaptels anywhere in the image, to avoid any advantage to an adaptel, the seed for the first adaptel is chosen to be the center pixel of the image. The algorithm can now be explained with reference to the flow chart of FIG. 1 and the images of FIGS. 2 to 4, which represent a simplified square image I, in this example consisting of 9×9 small squares representing pixels.

Figure 2:
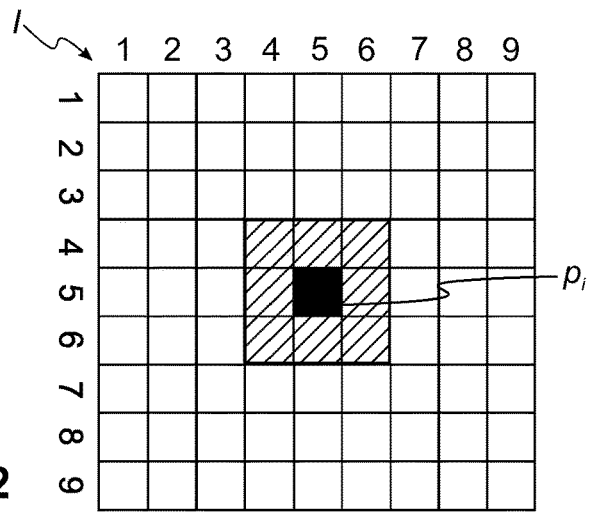
FIGS. 2 to 4 show simplified example pixel level image representations at different stages of the segmentation method.
Figure 3:
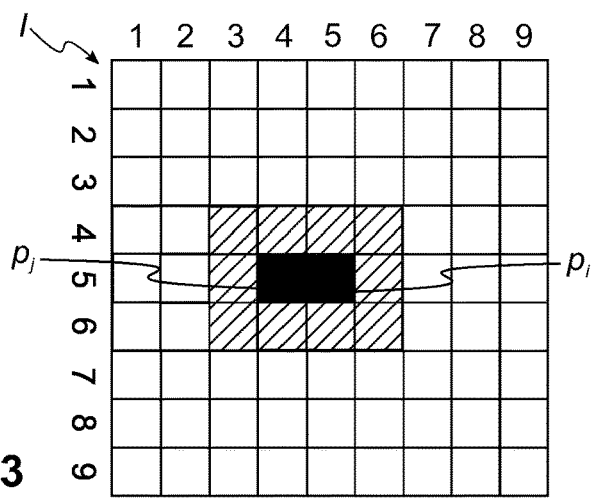
Figure 4:
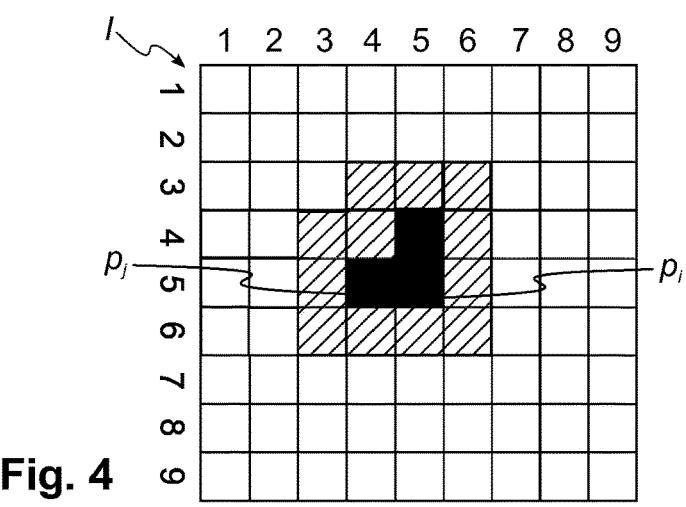

In step 11, a central pixel $p_i$ of the image I, as shown in FIGS. 2 to 4, is added to the seed buffer. The seed buffer is arranged to store potential seed pixel candidates for other adaptels. In step 13, it is determined whether or not the seed buffer is empty. If the seed buffer is empty, then the algorithm comes to an end. In step 15, the index i of a pixel that has not been labeled yet is retrieved from the seed buffer. A non-labeled pixel means that this pixel has not yet been allocated to an adaptel. In the present case, the central pixel $p_i$ or its index i is retrieved from the seed buffer. In step 17, a new adaptel is started and initialized, with this pixel as the seed pixel. For this, the size of the present adaptel is set to one, the initial color is updated so that $C^\Sigma = C_i$, the distance map D is set to zero, i.e. all values in the distance map are set to zero, and it is ensured that the content of the heap of the current adaptel is empty. Also in step 17, a first node is created and added to the heap. As a result, the center pixel $p_i$ is now part of the newly generated adaptel. Also the center pixel index i and the accumulated color distance value associated with the current pixel are located in the heap as a node. FIG. 1 illustrates the situation where the center pixel $p_i$, illustrated as a black square, has been added to the first adaptel. FIGS. 2 to 4 illustrate various stages of the segmentation algorithm. In all these figures, the pixels belonging to the adaptel at a given instant are shown as black squares.

In step 19, it is determined whether or not the heap is empty. If it is, then the process continues in step 13. However, if the heap is not empty, then in step 21 the heap is popped, which means that the top-most element (i.e. node) is retrieved from the heap. In other words, the node which has the smallest accumulated color distance value is read and removed from the heap. In this case, the node corresponding to the center pixel $p_i$ is popped from the heap. At this stage the center pixel $p_i$ is the only pixel in the heap. In step 23, it is determined whether or not the accumulated color distance value for the pixel corresponding to the retrieved node is smaller than the threshold T. In this case, since the center pixel $p_i$ is under consideration, the question is: D[i]<T? If the response to this question is negative, then in step 25, the pixel of the current node is added to the seed buffer and the process continues in step 19 by popping the top-most node off the heap.

In step 23, instead of checking for the accumulated color distance, one could check for some other property against a threshold. Examples of such a property are: the accumulated variance of an adaptel with respect to its average descriptor, an accumulated standard deviation of the adaptel with respect to its average descriptor, and the entropy of the distribution of the pixels of the adaptel. Generally, whenever a pixel is added to an adaptel, the properties of the adaptel change. This change can be measured and accumulated based on the property of the adaptel or its constituent media elements we consider. One way is to note the color distance of the new pixel from the current adaptel's average color. Another way is to note the change in variance of the adaptel compared to the current variance. Another way is to note how much gradient value, associated with the new pixel, gets added to the current adaptel. In essence, one needs to accumulate some property of the adaptel that changes whenever a new pixel gets added to it. One can term this accumulated change of an adaptel as its total energy. It is possible to compute this energy in terms of any desired property that is accumulated upon the addition of each new pixel.

If the response to the question of step 23 is in the affirmative, then in step 27, it is determined whether or not there is a pixel in the neighborhood of the current pixel (in this case the center pixel $p_i$) with a different label compared to the label of the current pixel or if the neighborhood pixel is not yet labeled. In FIGS. 2 to 4, the neighborhood pixels are denoted by hashed squares. In other words, in this step, it is determined whether or not the neighborhood pixel (let us denote this pixel $p_j$ as shown in FIGS. 3 and 4) belongs to a different adaptel than the current pixel i or does not belong to any adaptel yet. The neighboring pixels are typically defined according to 4- or 8-connectivity. 4-connected pixels are neighbors to a pixel if the edges of the neighboring pixels touch one of the four edges of the pixel, while 8-connected pixels are neighbors to a pixel if the edges or corners of the neighboring pixels touch the pixel. However, other connectivities could be used instead. For example, when dealing with voxels, 6, 18 or 26-connectivities could be used. In this example 8-connectivity is used to define the neighboring pixels as is shown in FIGS. 2 to 4, where the neighboring pixels are indicated with forward hashing. If the response to the question of step 27 is in the affirmative, then in step 29, the color distance d between the neighbor pixel and the current pixel is computed. In this case, the color distance is computed between the pixels $p_i$ and $p_j$ and the distance is denoted $d_{i,j}$. However, if the response to the question of step 27 is negative, then the process continues in step 19.

In step 31, it is determined whether or not the accumulated distance value of the current node plus the distance d between the current node and the neighbor pixel is smaller than the current accumulated distance value of the neighbor pixel. At this stage, it is thus determined whether or not D[j]>D[i]+$d_{i,j}$? If the response is negative, then the process continues in step 27. However, if the response is positive, then in step 33, the neighbor pixel is labeled or relabeled as belonging to the current adaptel started in step 17. Also, the accumulated color distance value of the neighbor pixel is updated to take the value of the accumulated color distance value of the current node plus the distance d between the current node and the neighbor pixel. In other words, at this stage D[j]=D[i]+$d_{i,j}$. Also in this step, the accumulated color value or the color accumulator $C^\Sigma$ of the current adaptel is updated. Furthermore, a node for the neighbor pixel is generated and added to the heap. The process next continues in step 27.

The image of FIG. 3 illustrates the adaptel at a stage, where the neighbor pixel $p_j$ and the seed pixel $p_i$ form the adaptel. Again, the neighborhood pixels of the adaptel at that stage are indicated by hashed squares. FIG. 4 shows the same image, but at a later time, at which point the adaptel is composed of three pixels. A seed pixel for a subsequent adaptel is chosen from one of the neighborhood pixels that is not part of this adaptel. In the algorithm, as became clear from the above example, nodes are only added to the heap if a pixel identified by the pixel index of a particular node is added to the adaptel. In other words, the nodes that are added to the heap are the neighbors of currently accepted pixels. Any pixel that has become part of an adaptel has been popped out of the heap and is no longer a part of it. The heap only contains potential adaptel members, not the ones that have already been included in an adaptel. And the ones that are popped but not included in an adaptel go into the seed buffer to become potential seeds. Every time a new pixel is added to or removed from the current adaptel, the accumulated color distance value and the average color value of the adaptel are updated. It is to be noted that in step 33, it is possible to reallocate a pixel from another adaptel to the current adaptel. This happens if the pixel belonging to another adaptel is reachable from the current seed pixel with a smaller distance than from its own previous seed. In this manner different adaptels compete for each other's pixels. This means that, according to the proposed algorithm, previously finished adaptels may once again evolve while the algorithm progresses and when new adaptels are generated. To achieve the competing aspect of the pixels, the algorithm visits each pixel 4 or 8 times (in the described example) depending on the connectivity (4 times if 4-connectivity is used or 8 times if 8-connectivity is used. Moreover, based on the proposed algorithm, various pixels forming an adaptel are connected and contiguous, which results from the fact that every adaptel grows around its seed pixel.

Figure 6:
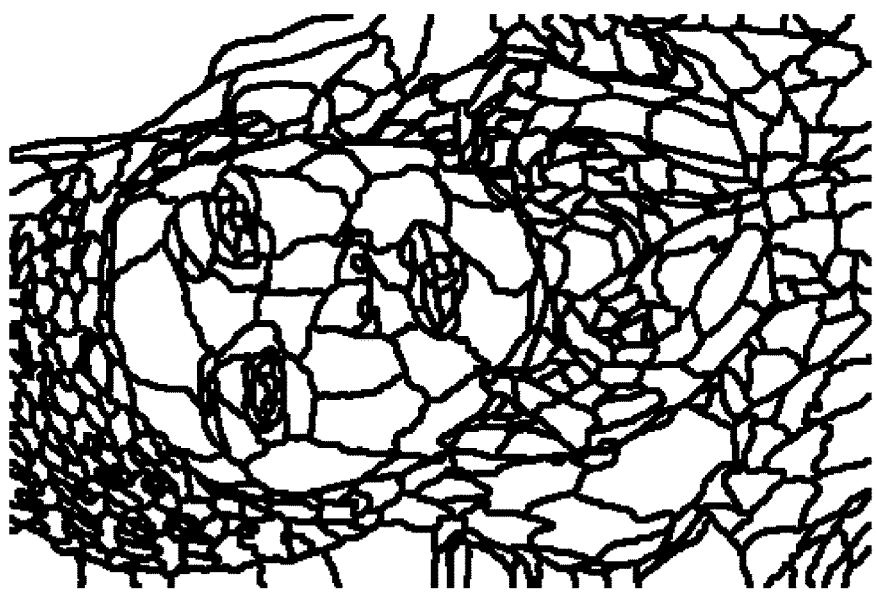
FIG. 6 shows another example image segmented according to the segmentation method of the present invention.
Figure 5:
FIG. 5 shows an example image segmented according to the segmentation method of the present invention.

FIGS. 5 and 6 show two examples of images segmented using the proposed segmentation algorithm. FIG. 5 shows a head of a woman wearing a hat with hands placed under her chin. As the hat comprises a fine pattern of various shapes, the adaptels describing this part of the image are of a small size. However, some parts of the face and, in particular the background, have relatively large adaptels, since the scale of the information in those parts of the image is relatively large. FIG. 6 shows a woman wearing a dress leaning on a wall. The adaptels describing the dress are larger than the other adaptels, since the dress does not show any particular details, which would need a smaller adaptel size. In both images, the adaptels are compact and they have a very high boundary adherence.

Figure 7:
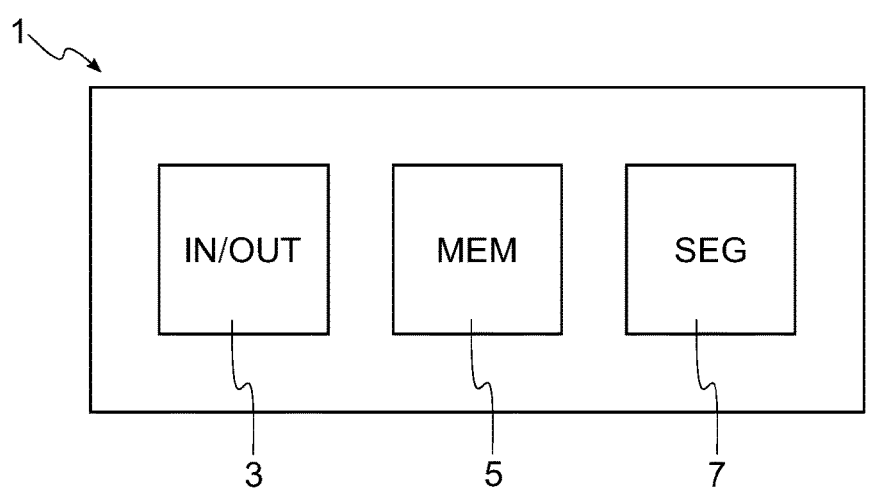
FIG. 7 shows a simplified block diagram of an example segmentation apparatus according to the present invention.

FIG. 7 shows a simplified block diagram of a media item segmentation apparatus 1, which can be used to perform the segmentation algorithm. The apparatus 1 comprises an input/output unit 3, which is configured to receive media items which need to be segmented. This unit is also arranged to output the segmented media items. The input/output unit is connected to a data memory 5, which is arranged to store the segmented and/or non-segmented media items. The memory 5 is also connected to a media item processing unit 7, which is arranged to carry out the segmentation algorithm according to the present invention.

As was explained above, the proposed algorithm has only one threshold T, which in the above example is the accumulated color distance threshold. This can be chosen empirically. Alternatively, if a specific number of segments is desired, T can be found by a simple search which involves trying several runs of the algorithm with different values of T until a suitable one is found. Interestingly, the proposed algorithm can be run in a default threshold mode by using the fact that in the CIELAB space, the color distance difference between two just noticeable distances is equal to 1. Based on this, for most natural images, it is recommended for T to use a value between 40 and 80, or more specifically between 50 and 70, such as value 60, for example, to capture all significant scale properties and yet still be able to simplify the image by about two orders of magnitude in terms of adaptels to pixels.

In the proposed algorithm, it possible to upper-limit the size of the adaptels to obtain substantially equally-sized adaptels. To do this, it is possible to impose a threshold on the maximum achievable size of the adaptel in the algorithm. The compactness of the adaptels can be increased if necessary, by adding a spatial distance term in Equation 3 as follows:

$$d_{k,j}=\|C_k^\mu-C_j\|+\lambda\|P_i-P_j\|, \quad (5)$$

where P=$[x, y]^T$ is the spatial position vector and $\lambda$ is the weight given to the spatial term (usually less than 1). Equation 3 is a special case of this distance, where $\lambda$=0.

As explained above, the proposed algorithm can be extended to videos and three- or multi-dimensional image stacks with ease. In order to do this the only change required is the size of the neighborhood set searched around a pixel. Instead of a two-dimensional neighborhood, a 6, 10, or even 26-connected three-dimensional neighborhood will be considered. Experiments suggest that 6-connectedness suffices for most practical purposes. The significant advantage of the adaptels in three-dimensional segmentation is that due to the possibility that segmentation can be started at any pixel in the volume, the first seed can be the central pixel of the first frame or slice. Starting this way, only a few (even only two, if needed) frames need to be kept in memory at a time. Most existing supervoxel segmentation algorithms require the entire volume to be held in memory, making them impracticable for real-world applications.

In a further variant of the invention, it is possible to create adaptels non-sequentially or in parallel if there is a way to know the seed locations beforehand. For example, it is possible to first run the above algorithm in order to obtain a segmented media item comprising scale-adaptive adaptels, and then after that, one can use the media items at the centroidal positions of these adaptels as the starting seeds for a subsequent fine-tuning segmentation round. The subsequent segmentation round may follow the teachings above with the exception that the seed positions are now defined before starting this subsequent segmentation round. In such a case adaptels can be regrown from these seeds simultaneously. This results in refining the adaptel boundaries. Another way is to use seeds at regular grid intervals as done by conventional superpixel algorithms. In such a case, adaptels obtained are similar to other superpixels. They lose the property of being scale-adaptive, but retain the other good properties of compactness, boundary adherence, and computational efficiency.

While the invention has been illustrated and described in detail in the drawings and foregoing description, such illustration and description are to be considered illustrative or exemplary and not restrictive, the invention being not limited to the disclosed embodiment. Other embodiments and variants are understood, and can be achieved by those skilled in the art when carrying out the claimed invention, based on a study of the drawings, the disclosure and the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A method of segmenting using a media item processing unit in a computer vision processing system, a media item, of an image comprising pixels or voxels, referred to hereinafter as media elements, to provide adaptive media elements based on the media item which allow for efficient and accurate processing of a wide range of feature sizes within the media item, whether including uniform, varying, or uniform and varying feature sizes of real-world objects depicted in the media item and processed by the computer vision processing system to allow the computer vision processing system to interact with the real-world objects, the method comprising:
   a. selecting a first seed media element for a first cluster of media elements for forming a first a scale-adaptive superpixel or supervoxel, referred to hereinafter as a first adaptel;
   b. selecting a second seed media element, different from the first seed media element, for a second cluster of media elements, different from the media elements of the first adaptel, for forming a second a-scale-adaptive superpixel or supervoxel, referred to hereinafter as a second adaptel;
   c. forming the first and second adaptels, starting from the first and second seed media elements, respectively, by allocating a first plurality of the media elements one media element after another to the first adaptel, and allocating a second plurality of the media elements one media element after another to the second adaptel; and
   d. reallocating at least one media element of the first adaptel to the second adaptel if the at least one media element of the first adaptel is reachable from the second seed media element with a smaller accumulated distance than from the first seed media element, wherein the second seed media element is selected from a set of the media elements neighboring the first adaptel;
   wherein the adaptels provide fine resolution of feature rich portions of the media item and low resolution of featureless portions of the media item which may then be processed efficiently and accurately by the computer vision processing system.

2. A method according to claim 1, wherein the accumulated distance depends on at least one of the following: an accumulated color value of a particular adaptel, an accumulated variance of a particular adaptel, an accumulated standard deviation of particular adaptel, and entropy of the distribution of the media elements of a particular adaptel.

3. A method according to claim 1, wherein the accumulated distance is an accumulated property value obtained as a sum of distances between a current average value of the property of the media elements of a particular adaptel, and the property values of each of the individual media elements currently or previously added to the particular adaptel.

4. A method according to claim 3, wherein the property value is color distance.

5. A method according to claim 4, wherein the property value is color comprising one color intensity component and at least one color value component.

6. A method according to claim 1, wherein the media elements of the first adaptel are contiguous among themselves, while the media elements of the second adaptel are contiguous among themselves.

7. A method according to claim 1, wherein the method comprises finding neighboring media elements of the first and second seed media elements, and growing the first and second adaptels by allocating at least some of the neighboring media elements of the first seed media element to the first adaptel, and allocating at least some of the neighboring media elements of the second seed media element to the second adaptel.

8. A method according to claim 1, wherein the method comprises, once a new media element has been allocated to the first or second adaptel, updating their respective accumulated property value and their respective average accumulated property value.

9. A method according to claim 1, wherein a new media element is allocated to the first or second adaptel only if a sum of distances between a respective adaptel evolving average property value and an individual media element property value of all media elements previously allocated to the respective adaptel is below a threshold.

10. A method according to claim 9, wherein the threshold is user-defined.

11. A method according to claim 9, wherein the threshold is between 40 and 80.

12. A method according to claim 1, wherein the first adaptel is allowed to grow to a maximum size before starting to form the second adaptel.

13. A method according to claim 1, wherein the first seed media element is located substantially at the center of the media item.

14. A method according to claim 1, wherein the method comprises defining a first neighborhood set comprising a first set of media elements neighboring the first adaptel, and selecting the second seed media element from the first neighborhood set.

15. A method according to claim 14, wherein the second seed media element is randomly selected from the first neighborhood set.

16. A method according to claim 1, wherein the method comprises defining a second neighborhood set comprising a second set of media elements neighboring the first and second adaptels, and wherein the second set of neighboring media elements have not yet been allocated to any adaptel, and selecting a third seed media element from the second neighborhood set for a third adaptel.

17. A method according claim 1, wherein the media item is an image or a video.

18. A method according claim 1, wherein the media element is a pixel or a voxel.

19. A computer program product comprising instructions stored on a non-transitory medium for implementing the steps of the method according to claim 1 when loaded and run on computing means of an electronic device.

20. A media item segmentation apparatus for segmenting a media item comprising pixels or voxels in a computer vision processing system, referred to hereinafter as media elements, to provide adaptive media elements based on the media item which allow for efficient and accurate processing of a wide range of feature sizes within the media item, whether including uniform, varying, or uniform and varying feature sizes of real-world objects depicted in the media item and processed by the computer vision processing system to allow the computer vision processing system to interact with the real-world objects, the apparatus being configured to perform operations comprising:
- a. select a first seed media element for a first cluster of media elements for forming a first a scale-adaptive superpixel or supervoxel, referred to hereinafter as a first adaptel;
- b. form the first adaptel, starting from the first seed media element, by allocating a first plurality of the media elements one media element after another to the first adaptel;
- c. determine a set of the media elements neighboring the first adaptel;
- d. select a second seed media element from the set of the media elements neighboring the first adaptel for a second cluster of media elements, different from the media elements of the first adaptel, for forming a second a scale-adaptive superpixel or supervoxel, referred to hereinafter as a second adaptel;
- e. form the second adaptel, starting from the second seed media element, by allocating a second plurality of the media elements one media element after another to the second adaptel; and
- e. reallocate at least one media element of the first adaptel to the second adaptel if the at least one media element of the first adaptel is reachable from the second seed media element with a smaller accumulated distance than from the first seed media element;

wherein the adaptels provide fine resolution of feature rich portions of the media item and low resolution of featureless portions of the media item which may then be processed efficiently and accurately by the computer vision processing system.

* * * * *